United States Patent
Engel et al.

[15] 3,692,837
[45] Sept. 19, 1972

[54] 1-TRIS(DIFLUOR-AMINO)METHOXY-2,2,2-TRINITROETHANE

[72] Inventors: Lawrence J. Engel, Denellen; Michael H. Gianni, Roselle; Charles Wiener, Linden, all of N.J.

[73] Assignee: Esso Research and Engineering Company

[22] Filed: Sept. 19, 1963

[21] Appl. No.: 310,972

[52] U.S. Cl..................260/584 C, 149/6, 149/7, 149/19, 149/21, 149/92
[51] Int. Cl...............................C07c 93/12
[58] Field of Search..................260/584, 584 C

[56] References Cited

UNITED STATES PATENTS 3,579,393  5/1971  Allan..........................149/74

Primary Examiner—Leland A. Sebastian
Attorney—Whelan, Brenner, Chasan, Marx and Wright and Henry Berk

EXEMPLARY CLAIM

1. The compound 1-tris(difluoramino)methoxy-2,2,2-trinitroethane having the formula:

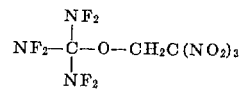

2. Method of preparing 1-tris(difluoramino)methoxy-2,2,2-trinitroethane which comprises reacting trinitroethanol with perfluoroguanidine at a temperature in the range of 0° to 150° C. for a period to form a resulting adduct thereof, separating excess perfluoroguanidine from the said adduct, then fluorinating the adduct with fluorine and recovering resulting 1-tris(difluoramino) methoxy-2,2,2-trinitroethane product.

3 Claims, No Drawings

1-TRIS(DIFLUOR-AMINO)METHOXY-2,2,2-TRINITROETHANE

This invention relates to the novel energetic oxidizer named 1-tris(difluoramino)methoxy-2,2,2-trinitroethane, its preparation, its utility as an oxidizer, and its utility as a plasticizer in a compatability rocket propellant with the object of developing solid rocket propellants of improved performance.

It is important to obtain energetic oxidizers that meet more rigorous standards and have adequate properties with respect to thermal stability, density, low volatility, low sensitivity in handling, compatibility with other propellant ingredients, and relative ease of preparation. The compound 1-tris(difluoramino)methoxy-2,2,2-trinitroethane is now shown in accordance with the present invention to be prepared suitably and to be acceptable in its evaluated properties. This compound has the structure:

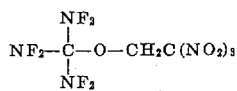

This compound contains one $NF_2$ group per carbon atom and one nitro group per carbon atom, and thus it contains two oxidizing groups per carbon atom to give the high energy value. This compound may be termed 1-tris($NF_2$)methoxy trinithroethane.

Early efforts to make the tris($NF_2$)methoxy trinitroethane compound failed, then later resulted in the formation of mixed products difficult to separate until finally the most satisfactory reaction requirements were discovered involving the reaction of trinitroethanol with perfluoroguanidine at suitable temperatures in the presence of certain solvents and/or a basic catalyst, preferably, urea. In the initial attempts to react the reactants with no catalyst, but in solvents, no reaction occurred at low temperatures. Subsequently, it was determined that reaction at the low temperature could be obtained by using a suitable catalyst such as urea or sodium cyanide. Without the catalyst, the reaction temperature may be in the upper part of the range of 0° to 150° C. Preferably, the reaction is run with catalyst at ambient temperatures in the range of 20° to 30° C.

The reactants employed are known substances which may be prepared in accordance with prior art, i.e. the trinitroethanol and the perfluoroguanidine. The perfluoroguanidine, which is less well known, is synthesized by fluorinating a salt of guanidine, e.g. guanidine carbonate dissolved in distilled water at an adjusted pH, preferably 5 to 6, by adding adding aqueous HF in accordance with the following equation:

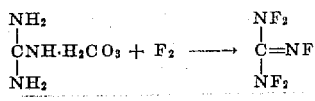

Specific examples on the preferred methods of forming 1-tris(difluoramino)methoxy-2,2,2-trinitroethane, the properties of the product with the relative merits and the effects of process valuables are given in the following example:

EXAMPLE - Catalyzed Reaction - Trinitroethanol with perfluoroguanidine

The reaction is represented by the following equation:

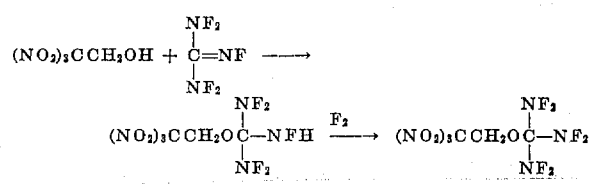

A reaction vessel containing 15 mg. of urea and 5 cc of acetonitrile was charged with 2.7 g. of trinitroethanol and then 5 g. of perfluoroguanidine. This mixture was allowed to stand at 23°C. with stirring for 72 hours. At the end of this period the excess perfluoroguanidine was removed and the mixture was cooled to 0°C. Fluorine gas in helium was then passed over this mixture at temperature for 1 hour. The mixture was then placed in a 2-bulb distillation apparatus. The bulb containing product was cooled to −5° to 0° C. and the collection bulb to −78° C. The solvent was then distilled under vacuum. The residue was placed on a silica gel chromatographic column and eluted with a 50/50 (V/V) chloroform-hexane mixture. The pure product in solvent was collected in the early fractions and obtained neat (free of other components) by removal of solvent under vacuum. The NMR analysis is consistent with the structure given by the 1-tris(difluoroamino)methoxy-2,2,2-trinitroethane.

Physical Characteristics

Thermal Stability
 6 days at 6° C. plus 1 day at 90° C. gave (a) 2.4 cc gas/g. and (b) 3.4 cc gas/g.
DTA No decomposition before 132°C.
Plasticizer Qualities
 Using the 1,2,4,5-tetrakis(difluoramino)-amyl acrylate polymer for plasticization studies, the following was found:

| | |
|---|---|
| Liquid uptake, wt. % | 54.6 |
| Tensile, PSI | 12 |
| Elongation, % | 40 |

To evaluate the merits of 1-tris(difluoramino)methoxy-2,2,2-trinitroethane as a liquid oxidizer and a plastizer, comparisons have been made with the oxidizer hexakis($NF_2$)dipropylether, which has the formula:

$$O)CHNF_2CHNF_2CH_2NF_2)_2$$

and which contains one $NF_2$ per carbon atom. Both of these oxidizers are of similar effectiveness for plasticizing energetic acrylate polymer binders such as poly[tetrakis($NF_2$)$_{2d}$] having the formula $[C_8H_9O_2(FN_2)_4 9_n$. Observations made and supported by data on physical properties are shown in the following table.

TABLE I

Comparison of Formulation Properties

| | TMTNE[1] | HPE[2] |
|---|---|---|
| Thermal Stability, cc/g | | |
| 100 hours, 60°C. | 2.0 | 2.3 |
| DTA Exotherm, °C. | 150 | 236 |

| | | |
|---|---|---|
| Shock Sensitivity, kg. in. | 11 3 | 4 |
| Melting Point, °C. | −17 to −14.5 | <−78 (−95) |
| Density | 1.54 | 1.65 |
| Boiling Pt. (est.), °C. (a) | 212 | 213 |
| Vapor Pressure at 25°C. (mm. Hg) | 0.4 | 0.13 |

(a) Extrapolation of vapor pressure curve.
(1) TMTNE - 1-tris(difluoramino)methoxy-2,2,2-trinitroethane
2) HPE - Hexakis(NF$_2$)dipropylether The DTA Exotherm in °C. is the temperature to which the substance can be heated without radical decomposition or explosion.

As indicated, the 1-tris(difluoramino)methoxy-2,2,2-trinitroethane can be used in a high proportion to form solid rocket propellant composites. For example, using equal proportions by weight of the 1 tris(difluoramino)methoxy-2,2,2-trinitroethane plasticizer and an NF$_2$ containing acrylate polymer binder (42.5 wt. percent), boron powder fuel, and hydrazinium diperchlorate oxidizer, a solid propellant having an Isp of 285 was obtained in comparison to 282 using a similar composite containing hexakis (NF$_2$)dipropylether in place of the 1-tris(difluoramino)methoxy-2,2,2-trinitroethane. Using nitronium perchlorate having a 5 wt. percent protective coating in the composite in place of the hydrazinium diperchlorate, the 1-tris(difluoraminomethoxy-2,2,2-trinitrothane plasticizer gave the composite an Isp value of 290.3. Replacing the boron powder with lithium powder adds about 6 seconds to the Isp value. In these comparisons the coating used on the nitronium perchlorate and on the lithium powder was a chlorinated and saturated hydrocarbon.

Although the 1-tris(difluoramino)methoxy-2,2,2-trinitroethane oxidizer has a lower NF$_2$ content than the hexakis (NF$_2$)dipropylether plasticizer and the nitro group is not as energetic as the NF$_2$ group, the NO$_2$ content of the 1-tris(difluoramino)methoxy-2,2,2-trinitroethane is favorable for reducing the amount of oxygen oxidizer required in the composites, particularly the more sensitive oxidizers such as nitronium perchlorate. The 1-tris(difluoramino)methoxy-2,2,2-trinitroethane may be regarded as superior in its oxygen oxidizing to the next best inorganic oxygen-oxidizer, hydrazine diperchlorate.

In the preparation of 1-tris(difluoramino)methoxy-2,2,2-trinitroethane there are three principle steps, namely: (1) the adduction reaction of the trinitroethanol with the perfluoroguanidine, (2) the fluorination of the resulting adduct and (3) the separation or purification of the fluorinated adduct.

From a number of tests it has been shown that an appreciable amount of the adduct and up to about 50 percent is obtained when the reaction is carried out at elevated temperatures, above 25° C. without catalysis. Essentially quantitative conversion to the adduct is obtained even at room temperature using suitable basic catalyst. In the fluorination step, the reaction product may be a mixture of the fluorinated adduct with unreacted initial reactants and by-products. The following table summarizes test conditions and results:

TABLE II.—TRINITROETHANOL/PERFLUOROGUANIDINE REACTION

Reactor: 10 ml. Glass Fischer-Porter Reactor; Perfluoroguanidine/Trinitroethanol Ratio: 3 to 6/1; Agitation: Magnetic Stirrer

| Temp., °C. | Time | Solvent | Catalyst | Results (identification table follows) |
|---|---|---|---|---|
| 25 | 3 weeks | CH$_3$CN | | No reaction. |
| 25 | do | CHCl$_3$ | | Do. |
| 25 | do | t-BuOH | | Do. |
| 50 | 8 hours | No solvent | | 50% conversion to (O$_2$N)$_3$CCH$_2$OC(NF$_2$)$_2$NFH. |
| 50 | do | CH$_3$CN | | Do. |
| 100 | 4 hours | CH$_3$CN | | Do. |
| 25 | 24 hours | CH$_3$CN | Urea | 100% conversion to (O$_2$N)$_3$CCH$_2$OC(NF$_2$)$_2$NFH. |
| 25 | do | CH$_3$CN | NaCN | 80% conversion to (O$_2$N)$_3$CCH$_2$OC(NF$_2$)$_2$NFH. |
| 25 | do | CH$_3$CN | Et$_3$N | 60% conversion to (O$_2$N)$_3$CCH$_2$OC(NF$_2$)$_2$NFH. |

NOTE.—The fluorination of the H form was carried out at 0° C. using 10% F$_2$ (in He) with CH$_3$CN as a solvent. NMR data suggests high conversion to —OC(NF$_2$)$_3$.

Thus, it can readily be seen that to eliminate the expense and complications of purification a preferred method employs a solvent such as acetonitrile and a catalyst such as urea.

The invention described is claimed as follows:

1. The compound 1-tris(difluoramino)methoxy-2,2,2-trinitroethane having the formula:

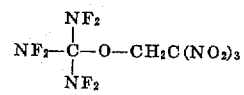

2. Method of preparing 1-tris(difluoramino)methoxy-2,2,2-trinitroethane which comprises reacting trinitroethanol with perfluoroguanidine at a temperature in the range of 0° to 150° C. for a period to form a resulting adduct thereof, separating excess perfluoroguanidine from the said adduct, then fluorinating the adduct with fluorine and recovering resulting 1-tris(difluoramino)methoxy-2,2,2-trinitroethane product.

3. Method of preparing 1-tris(difluoramino)methoxy-2,2,2-trinitroethane which comprises reacting trinitroethanol with excess perfluoroguanidine in acetonitrile with admixed urea as catalyst at a temperature in the range of about 20° to 30° C. to form a resulting adduct having the composition: (NO$_2$)$_3$CCH$_2$OC(NF$_2$)$_2$fh, removing excess perfluoroguanidine from said adduct and fluorinating said adduct with fluorine gas to obtain 1-tris(difluoramino)methoxy-2,2,2-trinitroethane which is then recovered.

\* \* \* \* \*